United States Patent [19]
Janow

[11] Patent Number: 6,061,570
[45] Date of Patent: May 9, 2000

[54] UNIFIED MESSAGE ANNOUNCING

[75] Inventor: Richard H. Janow, South Orange, N.J.

[73] Assignee: At & T Corp, New York, N.Y.

[21] Appl. No.: 08/803,790

[22] Filed: Feb. 24, 1997

[51] Int. Cl.[7] .................................................. H04M 11/00
[52] U.S. Cl. .......................... 455/458; 455/38.1; 455/567
[58] Field of Search ..................................... 455/458, 38.1, 455/31.2, 567, 412, 413; 340/825.44, 825.27; 395/326; 379/93.24, 100.08

[56] References Cited

U.S. PATENT DOCUMENTS

| | | | |
|---|---|---|---|
| 4,385,295 | 5/1983 | Willard et al. | 340/825.44 |
| 4,964,065 | 10/1990 | Hicks et al. | 455/67.7 |
| 5,117,449 | 5/1992 | Metroka et al. | 455/567 |
| 5,568,536 | 10/1996 | Tiller et al. | 455/557 |
| 5,579,472 | 11/1996 | Keyworth et al. | 340/825.44 |
| 5,594,782 | 1/1997 | Zicker et al. | 455/510 |
| 5,742,668 | 4/1998 | Pepe et al. | 455/413 |
| 5,848,362 | 12/1998 | Yamashita | 455/567 |

*Primary Examiner*—Salvatore Cangialosi

[57] ABSTRACT

A system and a service that collects information about waiting messages and forwards the collected information to a multi-service notifier device. Such a device may be wired or wireless and includes sensory indicators to convey message waiting indications from several messaging services. In accordance with one embodiment, the notifier device and the service cooperate via a wireless paging system. Each message service that a subscriber uses initiates a notification process when a message arrives. The process causes a page to be sent to the multi-service notifier device which informs the subscriber who carries the device that a message is waiting and which messaging service holds the message. In accordance with another embodiment, the notifier device is coupled to the telecommunication network over a channel that is used for other than pager communication, such as a POTS line.

23 Claims, 3 Drawing Sheets

6,061,570

UNIFIED MESSAGE ANNOUNCING

FIELD OF THE INVENTION

The invention relates to voice, e-mail, and other types of electronic messaging whose subscribers can benefit from notification that they have messages waiting for them.

BACKGROUND OF THE INVENTION

It goes almost without saying that messaging systems need an easy-to-use means of notifying subscribers that unanswered or high priority messages are waiting. The notification paradigm should fit subscribers' convenience and habitual activity patterns. Otherwise, subscribers must constantly interrupt their activities to access their message "mailboxes" without knowing in advance that there are messages actually waiting. When subscribers are far from home, they have to make expensive telephone calls just to find out whether they have any messages waiting. When at home, telephone answering machines typically provide visual indicator lights which are convenient and easy to use, but the customer must be physically present at the location to make use of them. Network voice mailbox services can likewise provide visual indicators (call waiting lights), but these are typically built into special terminal equipment. The network mailbox services can provide audio indicators such as "stutter dial tone", but subscribers must develop the habit of picking up the phone specifically to hear the notification. Many subscribers do not understand the meaning of the special tone, and only phones on a common line connected to the message service receive the notification.

These problems will become more serious as subscribers use messaging services more widely. Subscribers increasingly have multiple e-mail and/or voice accounts (e.g., at work and home), Internet chat and mail, multiple phone lines in the home with messaging capability, Internet voice telephony and messaging, etc. Regularly checking all these sources for messages can become tedious.

Ideally, there should be a single point of notification for all waiting messages, and for multiple mailboxes within each medium, if present. No such arrangements exist today.

SUMMARY OF THE INVENTION

Deficiencies in the prior art message notification schema are eliminated in accordance with the principles disclosed herein through a service that collects information about waiting messages and forwards the collected information to a notifier device that has a multi-mode sensory module. Such a device may be wired or wireless, and the multi-mode sensory module may include visual indicators or other means to convey the occurrence of a pre-specified event from a prearranged set of pre-specified events. In accordance with one embodiment, the pre-specified events of the set comprise message-waiting indications from several messaging services, and the notifier device and the service cooperate via a wireless paging system. Each message service that a subscriber uses initiates a notification process when a message arrives. The process causes a page to be sent to the multi-service notifier device which informs the subscriber who carries the device that a message is waiting and which messaging service holds the message. In accordance with another embodiment, the notifier device is coupled to the telecommunication network over a channel that is used for other than pager communication, such as a POTS line.

DETAILED DESCRIPTION

Figure 1:
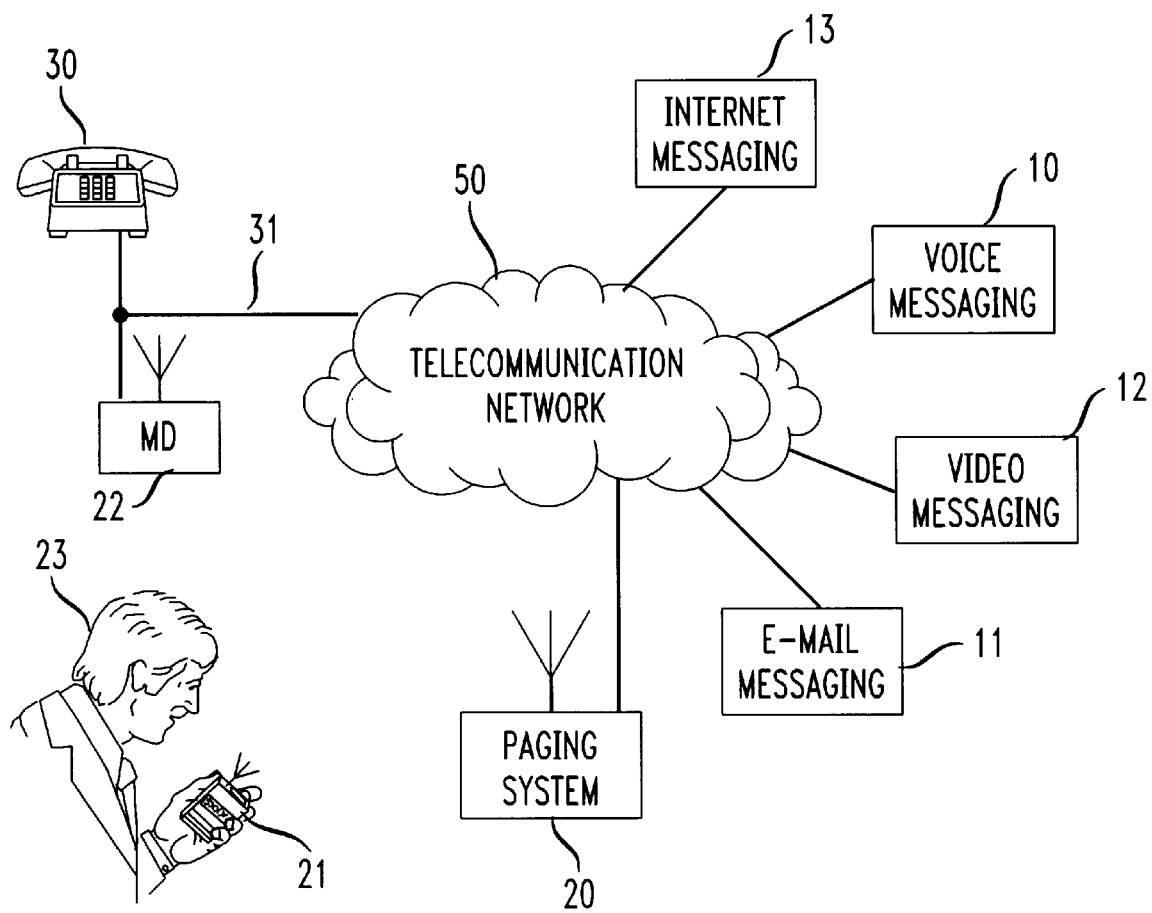
FIG. 1 illustrates a network arrangement adapted for providing the services disclosed herein.

FIG. 1 illustrates a telecommunication network arrangement. It includes elements 10, 11, 12, and 13 which are voice, e-mail, video and Internet messaging platforms. Those platforms are connected to telecommunication network 50 and, illustratively, through network 50 the messaging platforms access paging system 20. (Wireless means for connecting platforms 10–13 to system 20 may also be employed, and for purposes of this disclosure network 50 includes a wireless sub-network). Paging system 20 can communicate with pager 21 and messaging device 22. Messaging device 22 is connected to a conventional telephone line which also supports telephone 30.

Subscriber 23 pays for paging services and therefore is in possession of pager 21. Anyone who wishes to page subscriber 23 must contact pager system 20 and request that a page be sent to pager 21. (When used herein as a verb, the word "page" refers to the process of alerting a person who subscribes to a paging service. When used as a noun, the word refers to the collection of signals/information that is electronically communicated between a pager and a paging system.)

Assuming, for example, that subscriber 23 is also a subscriber of the messaging services offered by platforms 10–13, in accordance with the principles disclosed herein subscriber 23 can have a standing request with the messaging platforms to contact paging system 20 whenever messages arrive at the platforms that subscriber 23 wishes to know about. The information that associates pager 21 with the accounts that subscriber 23 has with the messaging platforms may reside in the platforms or in the pager system. The criteria for deciding when to alert subscriber 23 would, probably, be placed in the individual messaging platforms.

Figure 2:
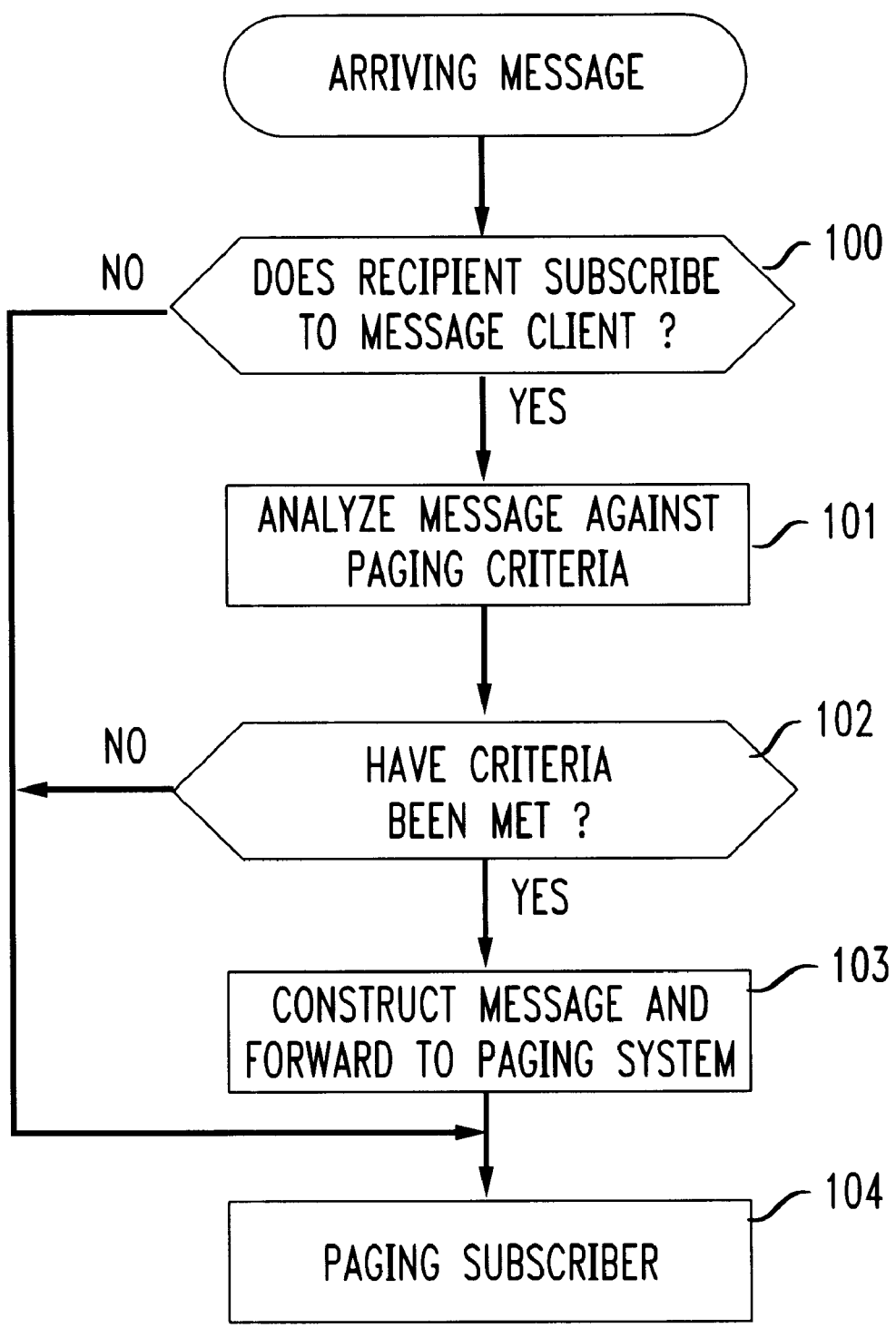
FIG. 2 is a flow chart of the process as it is carried out.

The procedure that is carried out, shown in FIG. 2, is quite simple. When a message arrives at a messaging platform, block 100 (in the platform) determines whether the intended recipient (e.g., subscriber 23) subscribes to the paging alert service. If so, the message is analyzed in block 101 to determine whether paging alert criteria have been met. The criteria may relate to the identity of the sender, to an urgency code in the message, time of day, etc. If block 102 determines that the paging alert criteria have been met, block 103 constructs a page message and causes the platform to forward the message to paging system 20. The message includes at least an indication identifying the platform and, perhaps, additional information. Lastly, block 104 causes pager system 20 to send a page to pager 21.

Figure 3:
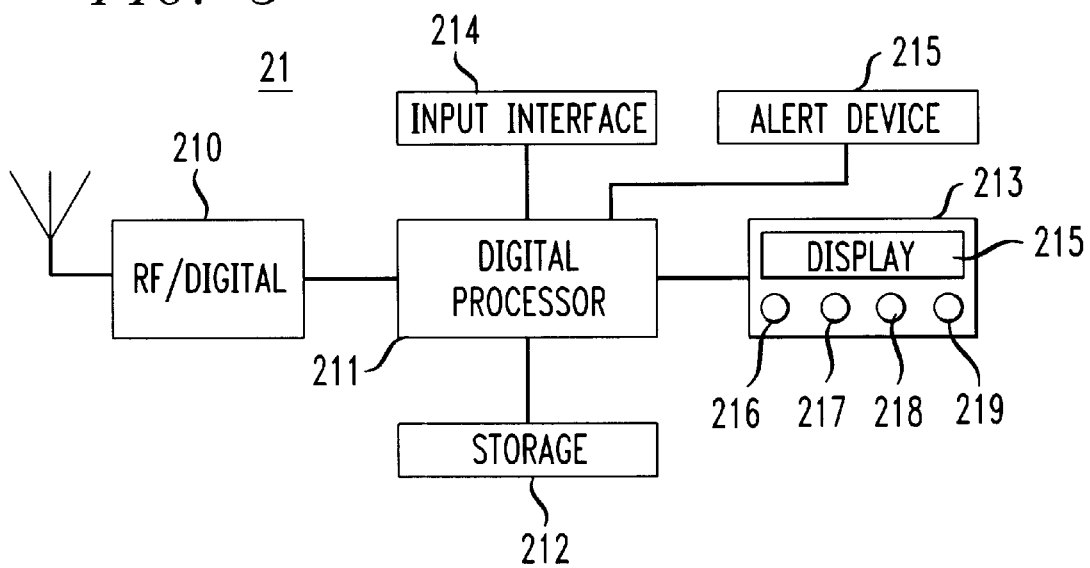
FIG. 3 presents a block diagram of a pager that comports with the principles of this disclosure.

FIG. 3 presents a block diagram of pager 21. It includes RF section 210 and a digital processor 211 coupled to the RF section. Also coupled to the processor are a storage memory 212, a display 213, an input interface block 214, and an alert device 215. The input interface block comprises one or more buttons, and the alert device is typically a ringer or a vibrator. The depicted block diagram is basically conventional, in the sense that other pagers have similar elements. It differs from conventional pagers, however, in that the processing carried out by processor 211 are adapted for the unified message announcing service disclosed herein, as well as the display and/or the alert means. Specifically with respect to display 213, in accordance with one embodiment it includes an alpha/numeric panel 215 and LEDs 216–219. It is the LEDs that give it its multi-mode characteristic, at least vis-a-vis the user.

Operationally, pager 21 operates as follows. An incoming page is detected in block 210. It outputs a digital stream corresponding to the information that system 20 has modulated onto the carrier signal. Processor 211 receives this information and processes it according to a pre-selected algorithm. This may include activating the alert device, displaying the message, and/or storing the message for later reference. In addition to these conventional operations, processor 211 analyzes the digital stream from block 210 to determine whether the incoming page is from one of the messaging platforms (elements 10–13 in FIG. 1). If so, an appropriate one of the LEDs is activated by processor 211 to show subscriber 23 that a particular messaging platform instigated transmission of the received page. This, of course, informs the subscriber that a message is waiting in a particular platform. Additional information can be displayed by panel 215, such as the message's originator, the message's type, etc.

Processor 211 also analyzes the received page information to determine the urgency level of the message. The results of this message can also be communicated via panel 215 and/or via the lit LED. For example, the LED can be made to operate in four modes (to communicate different information): off, continuous "on," slow blinking, and fast blinking.

Just as the LEDs can provide subscriber 23 with information, so can the alert means. Whether it is a sound, or a vibration, in accordance with another embodiment of the principles disclosed herein, the alert means is made to output a different alert signal, based on the information that is in the page, which identifies the source of the page (in the sense of who causes system 20 to send a page).

Input interface 214, or at least portions of 214, can be correlated with display 213. Specifically, each of the LEDs can be built into a separate push button. Pushing a button associated with one of the messaging platforms can be used to retrieve and display (on panel 215) additional information about the associated message (including, for example, the 800 number that may be used by the subscriber to contact the particular messaging platform), and when pager 21 is a two-way pager, pushing the buttons can signal pager system 20 that the message was received and "read". More advanced communication from pager 21 to system 20 may even direct pager system 20 to contact the appropriate platform and forward the stored message to a specified destination (e.g., telephone 30, or some other telephone specified by the subscriber). Of course, pushing the button would also extinguish the LED associated with the button.

It may be noted that although the four message platforms shown in FIG. 1 are all identified as being different in kind, that is not a necessary or even expected feature. Rather, it is quite possible and perhaps even likely that a particular subscriber will have more than one voice messaging platform (e.g., associated with his home and with his office).

It may also be noted that extinguishing an LED can be accomplished by pager system 20 as well as by subscriber 23. This is done when system 20 knows that it sent a page to pager 21 relative to messages from a particular platform, and is informed by that platform that all messages have been retrieved (or canceled by the originators of the messages).

Figure 4:
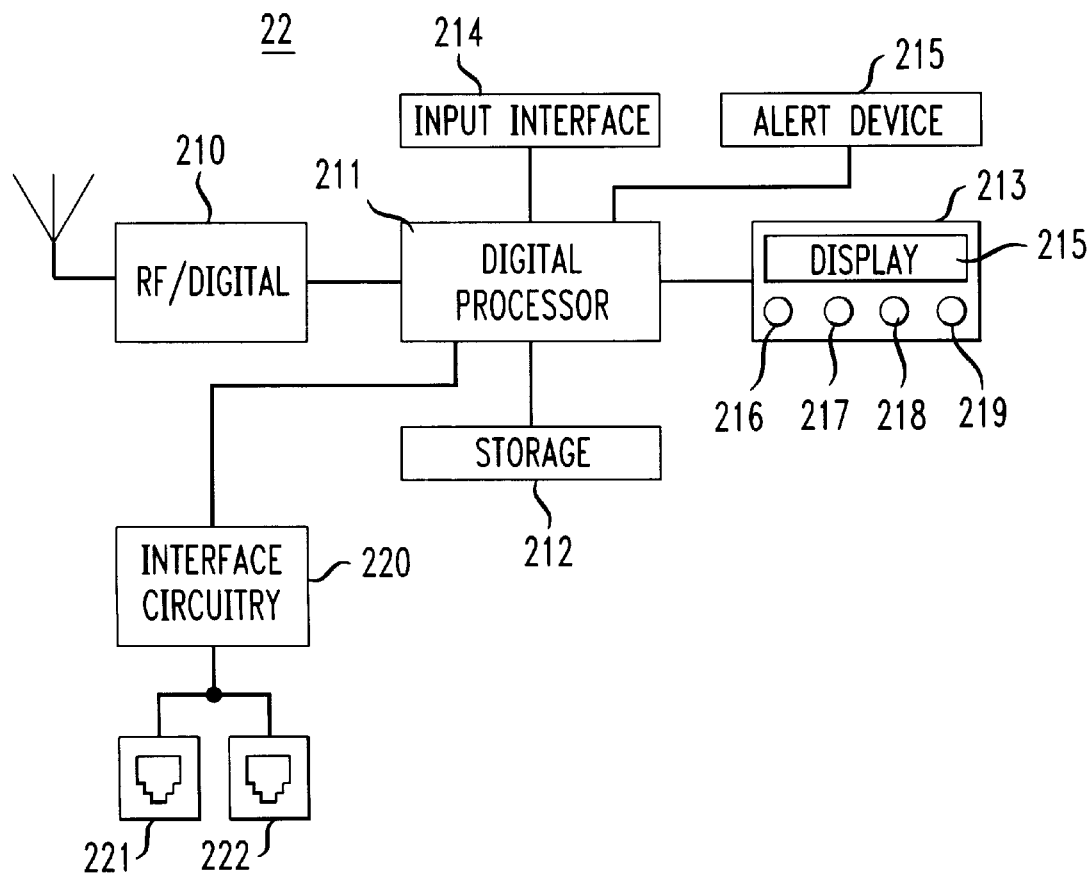
FIG. 4 is a block diagram of a different pager that comports with the principles of this disclosure.

Device 22 is also a pager in the sense that it has all of the elements found in FIG. 3. However, it also includes means for connecting pager 22 to network 50 via a connection that is associated with a telephone's connection to network 50. Illustratively, pager 22 includes means for connecting the pager to a telephone line which connects telephone 30 to telecommunication network 50. A block diagram of device 22 is presented in FIG. 4. In addition to the elements of FIG. 3, the FIG. 4 block diagram includes two RJ11 female connectors (221 and 222) that are connected in parallel to each other and are also coupled to processor 211 through interface circuit 220. Use of the two RJ11 connectors allows for easy connection of device 22 to the telephone line of telephone 30. Obviously, since device 22 has all of the elements of device 21, a subscriber can make do with a single variety of devices; to wit, the device 22 variety. It may be noted that connection of pager 22 to communication network 50 when telephone 30 is a wireless phone would be through the phone, rather than via a telephone line, and the connection means would likely not be a pair of RJ11 connectors.

Interface circuitry 220 is fairly conventional. It accepts DTMF signals at connectors 221 and 222 and converts them to digital signals that are applied to processor 211. Conversely, it converts digital signals applied to circuitry 220 by processor 211 and delivers DTMF signals to connectors 221 and 222.

Device 22 can also be connected to communication network 50 through a computer connected to the telecommunication network, rather than via a direct connection to a conventional telephone line. In such a case, however, interface circuit 220 needs to comply with whatever protocol is required by the particular computer port (e.g., the serial port) to which device 22 is connected.

Device 22 offers an advantage over device 21 in that it provides a mechanism for wideband communication with the messaging platforms that hold messages. Specifically, a subscriber can pick up telephone 30 and push a button associated with a lit LED. In response, processor 211 "goes off hook" with respect to telephone line 31 and dials a pre-stored number that corresponds to the telephone number of the messaging service. When connected to the messaging service, the normal mailbox account login procedure can proceed. In the alternative (although a bit risky), device 22 can be arranged to provide the security information to the messaging platform. A similar arrangement is implemented when device 22 is connected to a computer.

As an alternative, pushing an access button could support bypass by using a wireless uplink message that triggers an out-call by the messaging platform to telephone 30 or to any other telephone that is pre-stored in device 22 and is communicated to paging system 20 during the uplink. In an arrangement such as depicted in FIG. 1, where device 22 is connected to telephone 30, it is likely that the subscriber would wish the message platform to dial the number of telephone 30. Accordingly, it would be desirable for system 20 to be informed of the number of telephone 30 by pager 22. This information can be provided via a "registration" protocol which may require the subscriber to push a "register" button on device 22. That (or the user directly) would initiate a call to the network to return to telephone 30 its phone number. Once the number is known to device 22, the device uplinks the information to system 20. As an aside, when telephone 30 is a landline phone, informing system 20 that device 22 is fixedly connected to telephone 30 specifies the physical location of the device and allows the paging network to limit its transmissions to device 22 to the cell where telephone 30 is located.

As depicted in FIG. 3, device 22 is adapted for a connection arrangement whereby device 22 and telephone 30 are connected in parallel to the telephone line. With such an arrangement, device 22 can serve other functions that assist subscriber 23; for example, it can provide for the delivery of DTMF signals to the telephone line, in response to the pressing of a particular button on input device 214. The signals that are thus delivered are conditions to provide a particular service/function that is prescribed by signals that have been down-loaded into device 22 through its wireless (paging) interface, or pre-stored ab initio. An example of the former may be the access digits that are needed to select a particular IXC provider. An example of the latter may be a credit card number.

A slight, but functionally significant, variation in the structure of device 22 is achieved when connectors 221 and 222 are coupled to processor 211 through two distinct (perhaps time-multiplexed) paths. In such an arrangement, device 22 is truly interposed between telephone 30 and network 50. This allows for even greater functionality in device 22. For example, device 22 can be programmed to intercept DTMF signals sent by telephone 30 and apply some intelligence, such as sending those digits to system 20 via the wireless uplink. When those digits correspond to a telephone number to which telephone 30 wishes to make a connection, system 20 can instruct network 50 to call telephone 30 and then establish a connection between the desired phone number and telephone 30. The call can then be charged to subscriber 23 who owns device 22 rather than to telephone 30.

In the above disclosure, system 20 is described as a paging system, but that notion need not be taken in a narrow sense. It should be appreciated, for example, that in a business setting where messages come to employees behind a PBX, and where those employees have devices 22, the PBX can send data to those devices that informs employees about the stored messages. The communication to devices 22 can be wireless, but it can also be via the telephone lines to which devices 22 are connected to the network. That is, either by wireless means or by means of the telephone line to which a device 22 is connected, the device can register itself to specify the line to which it is connected. Thereafter, the PBX (or a central office switch, for that matter) can send information to the device, by wireless means or by means of the telephone to which the device is connected, and thereby activate the alerting (e.g., the lighting of selected LEDs).

Devices 21 and 22 can also include other hardware and software to impart to these devices other capabilities such as paging, cellular telephony, PCS telephony, personal assistant functions, computing functions, etc.

I claim:

1. In a portable communications user-device including a processor, a wireless interface coupled to the processor, an alpha-numeric display coupled to the processor and a module for signaling a user of the device, the improvement comprising:
    a sensory multi-mode module that is distinct from said display module, and
    a software entity executed in the processor which, in response to data in a pre-specified portion of a signal received via an antenna at the wireless interface which signifies an event from a preselected set of events, activates the module in a mode of said multi-modes to signify said event.

2. The device of claim 1 where the module comprises a plurality of lights and the processor lights different ones of the plurality of lights in response to reception of different events.

3. The device of claim 1 where the module comprises a plurality of lights and the processor lights different ones of the plurality of lights in response to reception of some of the events and extinguishes different ones of the plurality of lights in response to reception of some oths of the events.

4. The device of claim 1 where the module comprises a vibrator and where the processor causes the vibrator to operate at different rates in response to reception of different events.

5. The device of claim 1 further comprising a port coupled to the processor for connecting a telephone to the processor.

6. The device of claim 5 where said processor is adapted to receive information that affects the execution of the software from either the wireless interface of the port.

7. The device of claim 5 further comprising an interface circuit interposed between the port and the processor, for converting DTMF signals into digital data signals and vice versa.

8. The paging system including a transmitter and a plurality of pagers that receive pages from the transmitter, the improvement comprising:
    a communication element for receiving information indicating status of a message that is awaiting a subscriber at a first messaging platform than receiving said message itself, and
    a processor for handling the received information that is restricted to forwarding said information to a page generator, where said page generator includes
    circuitry adapted to transmit said information only via pages, for constructing and transmitting a page that communicates said status of at least one message that is awaiting at said first messaging platform.

9. The system of claim 8 where the page also includes information that identifies said first messaging platform.

10. The system of claim 8 where the page also includes information other than status about said awaiting message.

11. The system of claim 10 where the information is priority information.

12. The system of claim 8 where said page includes information to indicate that at least one message is awaiting at a second messaging platform that is distinct from said paging system.

13. The system of claim 12 where said first and second messaging platforms are controlled by different service providers.

14. The system of claim 8 where said status indicates that an undelivered message previously awaiting at said first messaging platform is no longer available.

15. A communications and addressing system including a telecommunication port for receiving messages, a processor for processing received messages and for constructing pages in response to received messages, and a transmitter for communicating the constructed pages, the improvement comprising:
    a software module working with said processor which, when it receives a message-waiting signal from any one of a preselected set of message storage devices, constructs a page that specifies the message storage device that sent the message-waiting signal principally by other than a phone number associated with the message storage device that sent the message-waiting signal.

16. The system of claim 15 where the specification of the message storage device that sent the message-waiting signal also includes a phone number for retrieving a message that triggered the message-waiting signal.

17. The system of claim 15 where the module receives priority information with the message-waiting signal and includes this information in the constructed page.

18. The system of claim 15 where the module specifies a message storage device by a data word that a) identifies the message storage device as belonging to the set of message storage devices and b) differentiates the message storage device from other message storage devices in the set of message storage devices.

19. The system of claim 15 where the module, when it receives a message cancellation signal from any one of a preselected set of message storage devices, constructs a page that specifies the message storage device that sent the message cancellation signal principally by other than a phone number associated with the message storage device that sent the message cancellation signal.

20. The system of claim 15 further comprising a plurality of pagers, where each page includes a multi-mode module such that when a pager receives a page that contains a specification that a message-waiting signal was received by the system a processor in the pager activates the multi-mode module in one of its modes.

21. The system of claim 20 where at least some of the pagers are connected to consumer terminals, through landline or wireless connection.

22. The system of claim 21 where the consumer terminals are selected from a set that includes computers and telephones.

23. The device of claim 1 further including apparatus for imparting to the device communication and/or computing functions taken from a set comprising one-way or two-way paging, cellular telephony, PCS telephony, personal assistant functions, and computing functions.

* * * * *

UNITED STATES PATENT AND TRADEMARK OFFICE
CERTIFICATE OF CORRECTION

PATENT NO. : 6,061,570
DATED : May 9, 2000
INVENTOR(S) : Richard H Janow

It is certified that error appears in the above-identified patent and that said Letters Patent is hereby corrected as shown below:

Col. 6, line 5     change "oths" to --other--,
Col. 6, line 13    between "interface" and "the" replace "for" with --or--,
Col. 6, line 18    change "The" (first word) to --A--,
Col. 6, line 18    between "platform" and "than" insert --rather--.

Signed and Sealed this

Seventeenth Day of April, 2001

Attest:

NICHOLAS P. GODICI

Attesting Officer     Acting Director of the United States Patent and Trademark Office